United States Patent
Joshi et al.

(10) Patent No.: US 6,454,562 B1
(45) Date of Patent: Sep. 24, 2002

(54) OXY-BOOST CONTROL IN FURNACES

(75) Inventors: Mahendra L. Joshi, Darian; Ovidiu Marin, Lisle, both of IL (US)

(73) Assignees: L'Air Liquide-Societe' Anonyme a' Directoire et Conseil de Surveillance pour l'Etude et l'Exploitation des Procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/553,418

(22) Filed: Apr. 20, 2000

(51) Int. Cl.$^7$ .................................................. F27B 9/40
(52) U.S. Cl. ............................. 432/17; 432/19; 432/36; 432/37; 432/47; 432/146; 432/149; 432/159; 65/29.21; 65/162; 65/DIG. 13
(58) Field of Search ............................ 432/159, 17, 19, 432/24, 36, 37, 146, 149, 47; 65/29.21, 161, 162, DIG. 13

(56) References Cited

U.S. PATENT DOCUMENTS

| | | | |
|---|---|---|---|
| 3,954,433 A | | 5/1976 | Holler |
| 4,257,767 A | * | 3/1981 | Price ........................... 432/24 |
| 4,368,034 A | * | 1/1983 | Wakamiya ................... 432/11 |
| 4,473,388 A | | 9/1984 | Lauwers |
| 4,480,992 A | * | 11/1984 | Okamoto ...................... 432/18 |
| 4,577,278 A | * | 3/1986 | Shannon ................ 364/477.04 |
| 4,657,507 A | * | 4/1987 | Kohama et al. .............. 432/18 |
| 5,335,164 A | | 8/1994 | Gough, Jr. et al. |
| 5,513,098 A | | 4/1996 | Spall et al. |
| 5,687,077 A | | 11/1997 | Gouch, Jr. |
| 5,954,498 A | | 9/1999 | Joshi et al. |
| 6,055,524 A | * | 4/2000 | Cheng ......................... 706/14 |

FOREIGN PATENT DOCUMENTS

| | | | |
|---|---|---|---|
| WO | 90/12760 | 11/1990 | |
| WO | WO 00/23856 | * 4/2000 | ........... G05B/13/02 |

OTHER PUBLICATIONS

Gough, B., et al., "Predicitive–Adaptive Temperature Control of Molten Glass", Mar. 29, 2000, Brainwave Bulletin, Universal Dynamics Technologies, Inc., pp. 1–10.

Gough, B. et al., "Minimum Effort' Adaptive Control or Effluent Treatment, Kilns and Pulp Brightness", date unknown, pp. 1–12.

Marshall, R.W. et al., Temperature Control Measures Used in Glass Melting/Part two of this review of advanced control strategies for melters, and forehearths, Glass Industry, Nov. 10, 1990, pp. 8–11, vol. 71, No. 12, New York.

Wang, G. et al., "An Industrial Application of Predictive Control to Glass Process—Working Basis and Feeder", Proceedings of the Conference on Control Applications, IEEE, Aug. 24, 1994, pp. 1891–1896, New York.

* cited by examiner

Primary Examiner—Jiping Lu
(74) Attorney, Agent, or Firm—Linda K. Russell

(57) ABSTRACT

A process controls oxy-boost firing and air-fuel burner firing in furnaces, including large glass furnaces such as float furnaces. The large side-fired regenerative float furnaces use oxy-boost firing for a variety of reasons, including production increase, improved glass quality, lowering of superstructure temperatures, and reduction of emissions. An adaptive controller receives input data from process parameter sensors throughout the furnace, and adjusts its control logic for controlling both the oxy-boost burners and the air-fuel port burners.

9 Claims, 2 Drawing Sheets

OXY-BOOST CONTROL IN FURNACES

BACKGROUND OF THE INVENTION

1. Field of the Invention

The present invention relates to furnaces, and in particular to control of furnace temperatures.

2. Brief Description of the Related Art

An increased demand for flat glass (produced in float furnaces) all over the world is expected to become the major driving force for oxidant-fuel ("oxy") boosting technology. Joshi, M. L., et al, "Oxygen-fuel boosting as applied to float glass furnaces", Presented at the American Flame Research Committee, 1996, AFRC Spring Members Technical Meeting, Orlando, Fla., May 6–7, 1996. Due to relatively long engineering and construction phases for green field float plants, an effective on-the-fly oxy-boosting solution to meet immediate market needs is considered to be both a cost-effective and low-risk option by those in industry.

Typical float furnaces are side-fired regenerative types with five to eight ports per side. FIG. 1 illustrates a typical float glass tank 10 with six ports 22. The furnace 10 includes a sidewall 12, an interior chamber or space 14, and an entrance or doghouse 16. A waist section 18 receives the glass flow downstream of the interior chamber 14, from which the glass moves to a conditioning end 20 of the furnace. Due to the large dimensions of the tank, only cross firing is possible. FIG. 1 illustrates a six-port furnace with one regenerator chamber 24 assigned for each port. The regenerator chambers are used for preheating combustion air to between about 2200° F. (1204° C.) and about 2400° F. (1316° C.). A 20 to 30 minute cyclic process for heat recovery is typically applied using the exhaust gases. Air-fuel burners (not illustrated) are installed on each port with 2 to 3 burners per port. The burners are fired "under port," "through port," or using "side of port" firing configuration.

The furnace is also provided with oxy-boost burners 26. The common oxy-boost system is "port 0" boosting, meaning that the oxy-boost burners 26 are positioned between the charging wall at doghouse 16 and the first port 22. Typically, standard oxy burners or high performance staged oxy burners are installed at the port 0 location. The oxy-boost firing capacity can be as much as 5% to 20% of the total melter firing capacity. The oxy-boost process is used to attempt to increase the furnace pull rate, increase glass quality (e.g., reduced number of seeds, stones, etc., per ton of glass) at the same pull rate or at higher pull rate, decrease or maintain furnace peak refractory temperatures at the same or higher pull rate, decrease or maintain regenerator chamber temperatures at the same or higher pull rate, avoid plugging problems in the regenerator, as well as overcoming other difficulties which can not be achieved by the air-fuel firing of the port burners alone.

The challenge to successful use of oxy-boost technology is optimum firing of oxy burners at port 0 (or other strategic locations), coupled with specific (measured) changes in the air-fuel firing rate of the port burners. Thus, prior systems have attempted to optimize the overall heat-input profile to yield the above benefits.

The furnace operators at flat glass plants have attempted this optimization process by trial and error methods. For example, a human operator may reduce the air-fuel firing rate incrementally for each port, and subsequently increase the oxy-boost firing rate until the desired furnace refractory temperatures and profile, desired glass bottom temperatures and profile, required pull rate, and target glass quality numbers are obtained.

The difficulty in prior furnace operations is compounded due to the fact that oxy-boost control systems are not the same as, integrated with, or communicate with the air-fuel combustion control. Thus, retrofit oxy-boost systems are generally a stand-alone type and must be operated separately to manage the overall furnace operation. In many instances, the changes in oxyboost firing and air-fuel firing are not complementary and can upset the furnace operation. This can result in poor product quality or possible overheating of critical furnace refractory during this period.

The set point adjustments to achieve the desired furnace crown temperatures and glass bottom temperatures during oxy-boosting can take several weeks to several months, depending on the furnace and expertise level of the operator. A longer furnace settling time means greater loss in furnace productivity, poor product quality, and higher operating costs. Furthermore, if the furnace pull rate is changed for some reasons (say, due to changes in market demand), the whole adjustment procedure has to be repeated and new set points have to be determined for both oxy-boosting and air-fuel firing.

SUMMARY OF THE INVENTION

According to a first exemplary embodiment, a system useful for heating a product comprises a furnace having a sidewall and an interior space, at least one oxy-fuel burner positioned to direct a flame into the furnace interior space, a source of an oxidant in fluid communication with the at least one oxy-fuel burner, a source of fuel in fluid communication with the at least one oxy-fuel burner, a first valve set interposed between the oxy-fuel burner and the sources of fuel and oxidant, the first valve set operable to control the flow of oxidant and fuel to the at least one oxy-fuel burner, at least one air-fuel burner positioned to direct a flame into the furnace interior space, a source of air in fluid communication with the at least one air-fuel burner, a source of fuel in fluid communication with the at least one air-fuel burner, a second valve set interposed between the air-fuel burner and the sources of fuel and air, the second valve set operable to control the flow of air and fuel to the at least one air-fuel burner, at least one furnace condition input device generating at least one output signal, and a controller in communication with the at least one furnace condition input device to receive the at least one furnace condition input device output signal, the controller having a setpoint value for the at least one furnace value, the controller generating at least one control signal based on a comparison of the output signal and the setpoint, the controller being in communication with the first valve set to communicate the at least one control signal to the first valve set to set the flow rates of oxidant and fuel through the first valve set and to the oxy-fuel burner.

According to a second exemplary embodiment, a process of operating a furnace comprises the steps of firing an oxy-fuel burner into the furnace to heat a load, firing an air-fuel burner into the furnace to heat the load, measuring a furnace process parameter, inputting the measured process parameter into a controller, the controller having at least one setpoint for the measured process parameter, and controlling both the firing of the oxy-burner and the firing of the air-fuel burner with the controller based on a comparison of the measured process parameter and the at least one setpoint value.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
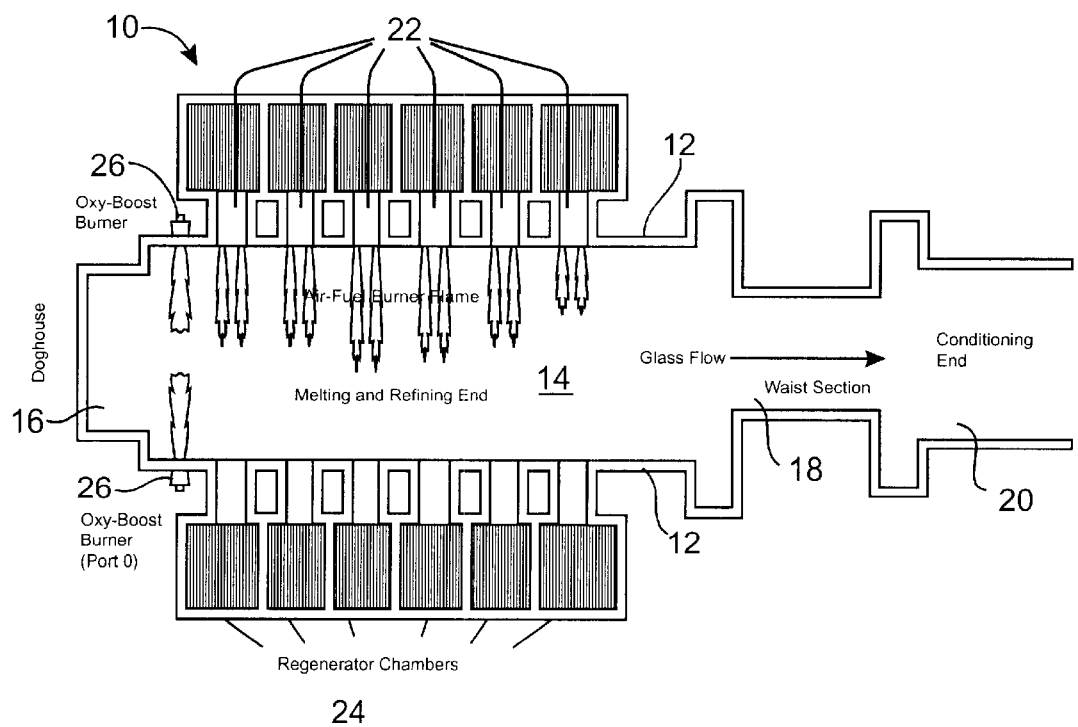
FIG. 1 illustrates a related furnace construction.

Referring to the drawing figures, like reference numerals designate identical or corresponding elements throughout the several figures.

In the present application, the term "oxidant" includes, but is not limited to, oxygen, oxygen-enriched air, oxygen-enriched (non-air) gas, air, and combinations thereof.

The present invention relates to a process control for controlling oxy-boost firing, and preferably also controlling air-fuel burner firing and/or hybrid oxy and air-fuel burner firing, in furnaces, including large glass furnaces such as float furnaces. The large side-fired regenerative float furnaces use oxy-boost firing for a variety of reasons, including production increase, improved glass quality, lowering of superstructure temperatures, and reduction of emissions. Preferably, the oxy-boost is performed between the doghouse and the first port, which is known as "port 0" firing. The success of oxy-boosting has in the past been dependent on smart changes initiated by an experienced human glass furnace operator. These operator-driven changes include modification in individual air-fuel burner firing rate and distribution, changes in temperature profiles for the furnace crown and glass bottom, changes in glass batch line location and careful adjustments in oxy-boost firing level in attempts to optimize the glass quality at a given pull rate.

The batch line in a furnace is the physical location in the melter where one can see unmelted batch (raw material) transition into melted batch or glass. This line, which is typically darker in appearance, moves along the furnace melter length, indicating the extent of the melting process. Processes and apparatus in accordance with the present invention shortens the distance from the batch line to one end of the furnace, which enables greater residence time in the furnace for the glass, better refining, and better overall glass quality.

The existing furnace control systems have been inadequate to automatically adjust both oxy firing and air-fuel firing to an optimum level at various pull rates while using an oxy-boost process. The present invention addresses these failings in the prior systems by using an adaptive controller to forecast the control adjustments necessary in both the oxy-boost and air-fuel firing in order to improve operation at any pull rate. The adaptive controller uses as input variables various furnace refractory and glass temperatures, exhaust gas temperatures, furnace or regenerator chamber pressure, glass level, glass pull rate, glass quality numbers (seeds/stones per ton) as feedforward inputs and forecasts control adjustments necessary for the oxy-boost burners and to optimize the firing distribution for the individual air-fuel port burners.

The present invention addresses the above problems related to optimizing operation of an oxy-boost system on large glass furnaces which were not adequately addressed in the prior systems. The adaptive controller of the present invention can learn from the "feed forward model" and can continuously adapt to the new conditions of the furnace process under oxy-boost firing.

The controller can be any one of several modern controllers which are commercially available. The controller can be an adaptive controller, a predictive controller, or a "model-free" adaptive controller. In general, an adaptive control system is a feedback control system which can adjust its own output or response to the changing process. A predictive control uses a predictive model, an optimization process within a time interval, and a feedback correction to adjust its output to the process. A "model-free" adaptive controller does not include a predetermined model of the process, and therefore does not require exact knowledge of the process which the controller is to control. Such "model-free" adaptive controllers require no advanced tuning, and are stable in a closed-loop configuration.

All of the foregoing controller products are commercially available under brand names such as Brainwave Process Control, available from Universal Dynamics Technologies, Inc., Richmond, BC, Canada (see also "The Concept in Process Control", Brainwave bulletin, (Universal Dynamics Technologies, Inc, 1999)), CyboCon, available from Cybosoft, General Cybernation Group, Inc., Rancho Cordova, CA. (see also "Model-free Adaptive Control Application Papers", Cybosoft, Vol. 2, Apr., 1998), Expert System ESII, available from Glass Service, Inc., Vsetin, Czech Republic, and INCA Control Package, available from IPCOS Technology b.v., Boxtel, The Netherlands. Other examples of suitable controllers and control methodologies are described in U.S. Pat. Nos. 5,335,164, 5,513,098, and 5,687,077.

The controllers create and modify their own logic by "observing" the process that is to be controlled, i.e., receiving data indicative of how different process signals relate to each other. This allows the controller to forecast the process response, and to tune itself in order to optimize the process. Adaptive controllers are a new generation of automatic process control and present certain advantages over prior control technology, including "Proportional-IntegralDerivative" (PID)-type controllers. While PID controllers have been work properly for simple processes, with only limited non-linearities and time variations, the PID controller must be tuned every time changes in the process occur. Adaptive controllers do not suffer from this inadequacy, and are therefore better suited to the complexities of furnace control.

By introducing and integrating certain furnace operation parameters into the adaptive controller, optimum oxy-boost levels and air-fuel burner firing can be determined faster for any particular pull rate than achievable with prior controllers. Additionally, the guesswork associated with the manual (operator) adjustment is eliminated and the furnace set point is achieved in a significantly shorter time frame when compared to current methods.

According to the present invention, certain furnace operating parameters can be used as feed forward inputs to the adaptive controller, and certain furnace process variables can be used in the control process to forecast the control outputs. The adaptive controller adjusts the oxy-boost burners, the air-fuel (or hybrid oxy and air-fuel) burners (individual port firing rate and distribution) firing rates, or both, based on the process output of the controller. The present invention can achieve reduced furnace settling time, increased productivity, improved product quality, and lower operating costs.

Figure 2:
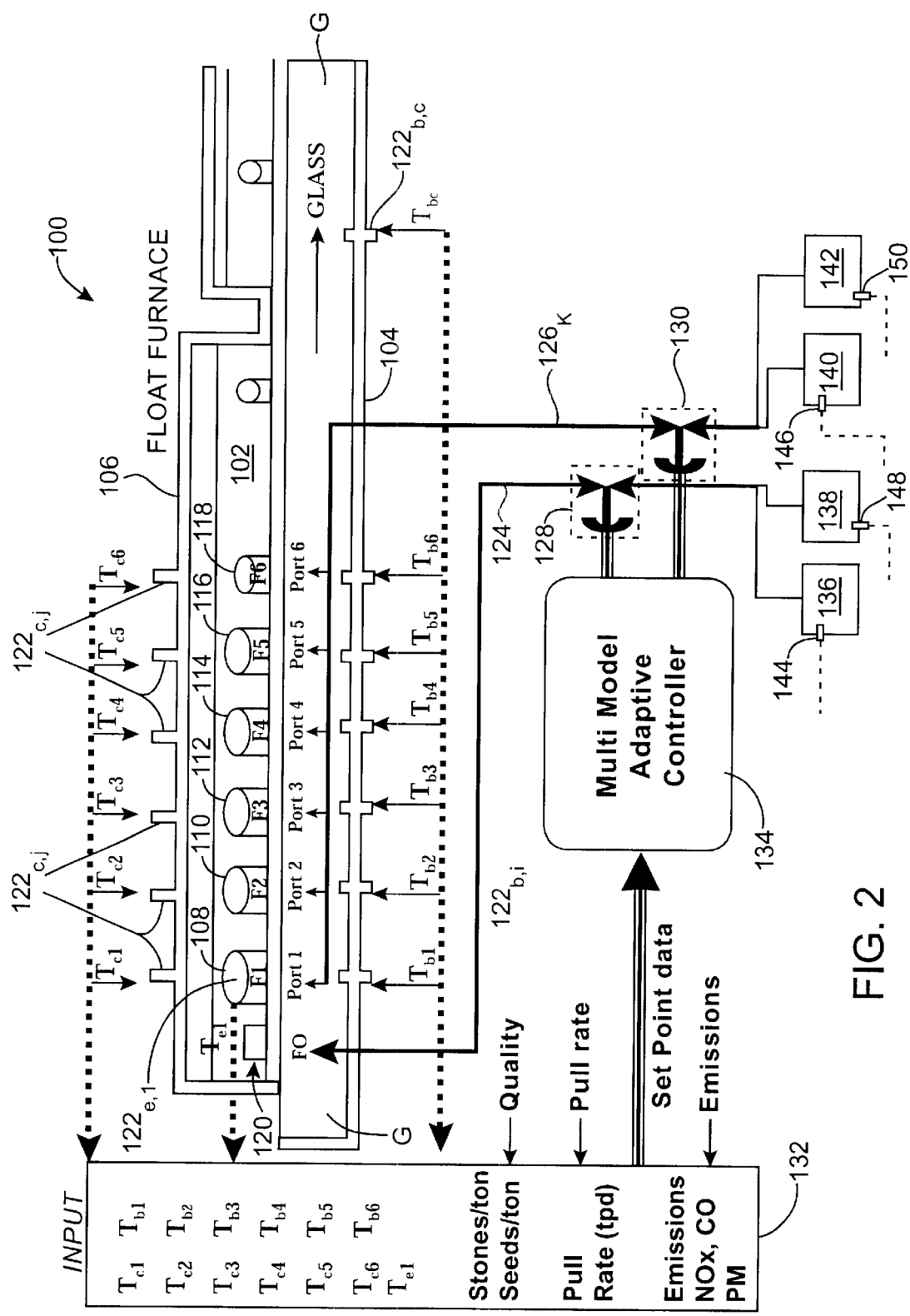
FIG. 2 illustrates a cross-sectional elevational view of an exemplary embodiment of a furnace in accordance with the present invention.

Turning again now to the drawing figures, FIG. 2 diagrammatically illustrates an exemplary embodiment of a furnace system in accordance with the present invention. While the embodiment illustrated in FIG. 2 is described with reference to a side-fired, regenerative flat glass float furnace 100, the present invention also relates to other types of furnaces as will be readily apparent to one of ordinary skill in the art.

The furnace 100 is generally similar to the furnace 10, described above with reference to FIG. 1, and includes an interior chamber or space 102 through which glass G passes and is heated. A bottom surface 104, a top or crown 106, and sidewalls (not illustrated in FIG. 2) delimit the interior chamber 102. At least one, preferably a plurality, and more preferably between 5 and 8 ports per side of the furnace, are provided which lead into the interior chamber 102. Each of the ports 108, 110, 112, 114, 116, 118 house or contain at least one, preferably a plurality, and more preferably 2 or 3 burners (not illustrated) directed into the interior chamber to heat the chamber and its contents to an elevated temperature. As will be readily appreciated by one of ordinary skill in the art, the burners together can heat the interior of the furnace 100 to extremely high temperatures, e.g., 3000° F. (1649° C.) or higher, as needed by the particular load. The burners of ports 108–118 can, within the scope of the present invention, be any type of burner, including air-fuel burners and hybrid oxy- and air-fuel burners operating at a predetermined or controlled firing rate ratio, e.g., 50:50.

In a manner similar to that described above with reference to FIG. 1, the furnace 100 includes at least one oxy-boost burner 120 on each sidewall in the "zero" port position between the charge wall and the first port. The oxy-boost burners 120 supply between about 5% and about 30%, preferably between about 5% and about 20%, of the total furnace firing capacity. As discussed briefly above, the use of the oxy-boost burners 120 can have certain advantages and benefits, if correctly used. The proper utilization of the heat available from the oxy-boost burners can increase the furnace production rate by up to 10%, while still maintaining glass quality. While there are many different measures of glass quality, one such measure of the glass quality can be defined by number of seeds (bubbles) per ton of glass or number of stones per ton of glass. These numbers can be very low (in the order of 2–3 stones/ton and 20–40 seeds/ton).

The furnace 120 is provided with at least one, and preferably a plurality of temperature sensors 122 positioned throughout the furnace to measure the temperature of the furnace at these locations. As illustrated in FIG. 2, at least one, and preferably a plurality of temperature sensors $122_{B,i}$ are positioned in the bottom 104 of the furnace to sense the temperature of the material along a portion of the length of the interior chamber 102. At least one, and preferably a plurality of temperature sensors $122_{Cj}$ are positioned at what is estimated to be the hottest locations in the furnace. In the embodiment illustrated in FIG. 2, temperature sensors $122_{Cj}$ are positioned in the crown of the furnace to sense the temperature of the crown along its length. Additional temperature sensors are also provided to sense the exhaust temperature at least at the first port ($122_{E,l}$) and further optionally in the downstream portions of the furnace ($122_{B,c}$). In the foregoing description, the variables "i" and "j" are used to indicate that there are from 1 to N and 1 to M temperature sensors 122 in each group, respectively. The values for N and M can be chosen to be any integer number. As will be readily appreciated by one of ordinary skill in the art, and as described in greater detail below, while large values of N and M provide more data as to the operation of the furnace, it requires more effective computing power to process this data. Thus, the number of sensors is chosen to strike a balance between process control reaction speed and process control accuracy.

A bundle of fluid flow lines 124 connects the oxy-boost burners 120 with sources of oxidant 136 and fuel 138. A bundle of fluid flow lines $126_k$ connects the burners in ports 108, 110, 112, 114, 116, 118 with sources of oxidant 140 and fuel 142 ("k" indicates the number of ports in the furnace 100). A set of valves and controllers 128 controls the flow of fluids through line bundle 124, while a set of valves and controllers 130 control the flow of fluids through line bundle $126_k$ will be readily appreciated by one of ordinary skill in the art, the flow of fluids (oxidant and fuel) through the valve sets 128, 130 determine the firing rates of the burners in the ports. Thus, for a given pull rate (material flow rate) for the furnace, the valve sets 128, 130 determine the temperature profile within the furnace and the material.

An input device 132 is in communication with each of the temperature sensors described herein ($122_{B,i}$, $122_{Cj}$, $22_{El}$, $122_{B,C}$, etc.), as well as optional additional sensors described in greater detail below, and receives from each data signals indicative of the temperature at that sensor's location. Additionally, the input device also includes devices, such as keyboards, data ports, and the like, by which other process input and output data can be entered into the input device. These process data can include, but are certainly not limited to, data representative of the quality of the material output by the furnace (such as the stones/ton and seeds/ton for a glass melting furnace), the pull rate (e.g., in tons per day), the furnace gas emissions (e.g., $No_x$, $CO$, $CO_2$, $SO_x$, etc.) and temperature as measured at the flue, furnace and/or regenerator chamber pressure, and glass level.

The input device 132 includes logic configured to assemble a subset or all of the data input to the input device and to communicate this data to a multi-model adaptive controller 134. The controller 134 is in control communication with the valve and controller sets 128 and 130 and controls the flow rates of oxidant and fuel to the oxy-boost burners ($F_O$) and to each of the burners in the ports ($F_1$–$F_K$) in the furnace 100. Thus, the controller 134 controls the temperature profiles of the furnace and the material processed in the furnace. The controller 134 can be any of the commercially available adaptive controllers, predictive controllers, and/or "model-free" controllers, including those specifically described above, including those described in the aforementioned U.S. patents.

The controller 134 is provided to monitor and control the oxy-boost material heating, e.g., glass melting, process. The controller's response is built by observing how the process signals (set points), such as crown temperatures ($T_{cj}$) and glass bottom temperatures ($T_{B,i}$) relate to the oxy-boost firing rate ($F_0$) or air-fuel firing rates ($F_K$).

The controller 134 sends the process response signals to the valve and controller sets 128, 130, or optionally to an existing furnace control system (not illustrated), such as a PID controller, for initiating the desired changes in the flow control valve settings for of both oxy-boost and air-fuel burners.

Figure 3:
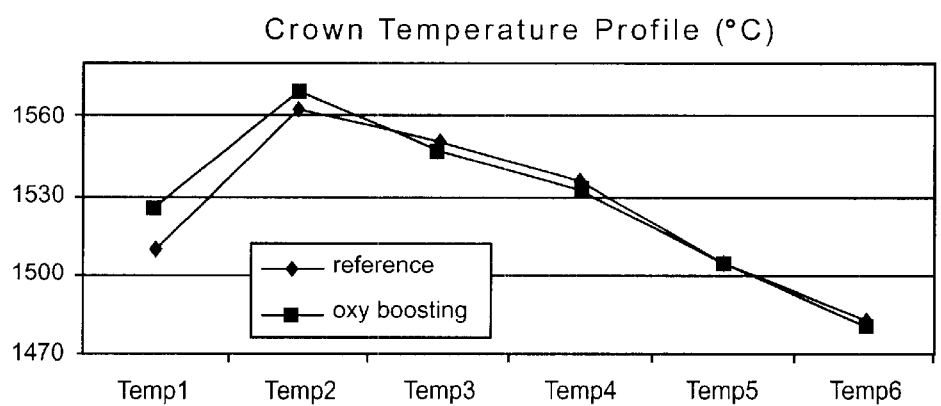
FIG. 3 illustrates a graph of a furnace crown temperature profile.

Glass furnaces, for example, typically operate based on a predetermined crown temperature profile and glass bottom temperature profiles, which are specific to each furnace. The human operator attempts to maintain these temperature profiles for obtaining appropriate glass quality at various pull rates. In FIG. 3, a typical temperature profile for a furnace crown is illustrated for a float furnace, the abscissa indicating the location of the temperature along the length of the furnace. In the example illustrated in FIG. 3, the temperatures for the reference (without oxy-boosting) and with oxy-boosting are compared for the same pull rate, the slightly higher crown temperatures in the charging area allows better batch glazing, mixing, and results in more homogeneous melting of the glass composition. The resulting glass quality was improved in both the number of seeds and stones per ton of glass.

The controller 134 optimizes the heating process performed by the furnace. The controller furthermore can build its own model from the process, or, for "model-free" controllers, to adjust the weights of its different logical blocks. The primary process and other feed forward models usable to "train" the controller can be any of a number of models of furnace operation. Thus, while specific examples are presented below, it is understood that the invention relates to any such process models which can be used to train an adaptive controller to control the furnace processes.

The primary process is the process which affects the end result of the furnace operation. The primary process includes, but is not limited to, changes in glass pull rate and glass quality from changes in oxy-boost and/or air-fuel firing rates. Thus, monitoring the process changes (pull rate, glass quality) during oxy-boost and air/or individual air-fuel firing rate changes allows the controller to learn the primary process when data indicative of the process changes are input back into the controller. Thus, the process change increments can be very small, yet should be greater than the system noise, which can be on the order of ±1 (seed, stone) in terms of glass quality and ±0.5% in terms of firing rates. The controller then uses the learned primary process to make accurate forecasts of process response to changes in the system inputs (burner firing rates). As will be readily appreciated by one of ordinary skill in the art, as any changes in the glass pull rate and quality are constantly updated, the controller can constantly update how it reacts to system changes. As a result, the typical model building time for an oxy-boost process can be as little as 5 to 6 days for the glass quality optimization, and as little as 3 to 4 days for pull rate increase.

Several feed forward models can also be used to fine tune the controller 134. Thus, while the process of the controller 'learning' the primary furnace process, that is, establishing some correlation, mapping, or function(s) between furnace pull rate and quality with oxy-boost and air/fuel burner rates, focused on the controller adapting to the general system parameters, the feed forward models provide additional process parameters that can be used as predictors or variables of the furnace process in addition to the primary process. While learning the primary process permits the controller to determine the general outline of the process, the feed forward models allow the controller to receive data and therefore learn about the numerous complex relationships in the furnace process which are indicative of how the process is proceeding. This permits the controller to then adjust the process inputs of the burner flow rates based on the predicted state of the furnace were the inputs not changed. The following examples of feed forward models are merely illustrative of the many models which are encompassed by the present invention, as will be readily apparent to one of ordinary skill in the art. Each feed forward model can be used to develop the controller's logic by zeroing or holding constant one of oxy-boost and air-fuel burner firing, varying the other to perturb the furnace process, and inputting the various measured process variables into the controller. The learning process can then be repeated for the other of oxy-boost and air-fuel burner firing being zeroed or held constant.

(1) Crown temperatures: The furnace crown temperatures, as measured by temperature sensors such as sensors $122_{C,j}$ can be used as feed forward inputs to be related with oxy-boost and/or air-fuel firing rates by the controller 134. The crown temperature profile using air-fuel firing alone can be used as a starting point. The effect(s) of changes in the crown temperature profile with changes in oxy-boost level are then correlated and incorporated by the controller into its own control logic. Thus, oxy-boost level and air-fuel firing can be controlled with out exceeding the refractory maximum temperatures.

(2) Glass bottom temperatures: Glass bottom temperatures, as measured by temperature sensors such as sensors $122_{B,i}$, can be used as feed forward inputs as well in a manner similar to the use of the crown temperatures. The effect(s) of changing oxy-boost and air-fuel firing rates on glass bottom temperatures is (are) correlated and incorporated by the controller into its own control logic. As the glass bottom temperature profile is generally indicative of the glass homogenization process and/or recirculation loops within the melter, incorporation of the effects of glass bottom temperature inputs into the controller logic can aid in obtaining good quality glass at various pull rates.

(3) Emissions: The emissions (NOx, CO, $O_2$, $CO_2$, SOx) of a furnace can also be used as feed forward inputs. The effect(s) of changes in the furnace emissions with changes in oxy-boost level are then correlated and incorporated by the controller into its own control logic. As NOx emissions are typically regulated by government bodies, incorporation of emissions data into the controller logic can render the emission feed forward model very important for furnace operators, including glass makers, and an optimized NOx level can be achieved during an oxy-boost process for the given pull rate using the present invention.

(4) Exhaust gas temperatures: The temperatures of exhaust gases leaving various ports can be used as feed forward inputs. The effect(s) of changing oxy-boost levels (in particular, port 1 exhaust gas temperature $TE_{EI}$, ) and air-fuel firing rates on exhaust gas temperature are correlated and incorporated by the controller into its own control logic. The port 1 exhaust gas temperature specifically indicates the level of oxy-boost firing achieved by the oxy-boost burner. Thus, by including the effects of this temperature in the logic of controller 134, the regenerator refractory temperatures can be safely maintained for a given pull rate.

(5) Glass properties: Several additional glass properties (reduction, oxidation, viscosity, color, etc.) can be used as feed forward inputs. The output from in-situ sensors for these properties, including optical sensors and methods, are input to the controller 134 and their effects incorporated in the logic of the controller 134. Thus, the controller 134 can control the oxy-boost firing level and air-fuel firing rates to achieve specific glass properties.

(6) The physical location within a glass furnace of a glass batch line can be verified by a commercially available CCD camera and can be used as a feed forward input. The oxy-boost and air-fuel firing is controlled to maintain the location of the batch line within the furnace at various pull rates. As it is known that the batch line location when an oxy-boost system is being used is closer to the charging wall, due to the much faster premelting/glazing process for the batch material, the input of batch line information to controller 134 allows the controller to effect product characteristics with oxy-boost and air-fuel burner firing rates.

(7) Refractory properties: Physical properties of the furnace refractory (e.g., thermal conductivity, thickness, etc.) can be used as a feed forward input, as measured by temperature sensors and the like. The oxy-boost and air-fuel firing is controlled to maintain the properties of the furnace refractory nearly constant or with very little change as a function of time. Furthermore, it is beneficial to maintain the refractory properties nearly constant in order to reduce corrosion effects from oxy-fuel firing.

(8) Regenerator or furnace pressure: The pressure in each individual regenerator-chamber, and/or overall furnace pressure, can be used as a feed froward input by measuring these pressure values with pressure transducers and forward feeding their output to controller 134. Oxy-boost firing generally reduces the average furnace pressure, in particular in the charging section, due to a reduction in total flue gases (especially in the port 1 regenerator chamber). This reduction can be attributed to elimination of nitrogen in the combustion gases. Generally, it is advantageous to close the regenerator combustion air inlet damper to maintain a reduced airflow rate, and thus an increased air preheat level in the regenerator chamber, in the several ports after the introduction of oxy-boost combustion in port 0. The optimum furnace and regenerator chamber pressure management can significantly improve furnace thermal efficiency and also glass quality.

The sources of oxidant 136, 140 can be any of a number of types of sources, including bulk liquid storage, cryogenic ASU (air separation unit), PSA (pressure swing adsorption), VSA (vacuum swing adsorption), TSA (thermal swing adsorption), or the like. Because the availability of oxidant to the burners effects firing rate, and therefore overall furnace operation, each of the sources 136, 140 can be optionally provided with an oxidant level sensor 144, 146, respectively. The oxidant level sensors generate signals indicative of the level of oxidant in the sources 136, 140, or optionally generate signals when the oxidant levels in the oxidant sources drop below predetermined levels. The oxidant level sensor signals can be input to input device 132 along with the other inputs, and used by controller 134 to control the operation of the burners, as indicated by the broken lines in the drawing figure.

The sources of fuel 138, 142 can also be provided with sensors 148, 150 which measure the calorific value of the fuel, e.g., gaseous hydrocarbon fuel. Because there can be variability in the Wobbe number, which is an index of the calorific value of the fuel, for a particular fuel source, which variability effects the burner firing rate, the output of sensors 148, 150 can also be input to input device 132 and used by controller 134 to control the operation of the burners, as indicated by the broken lines in the drawing figure.

In summary, the present invention has several aspects. The present invention relates to a methodology for optimizing the operation of oxy-boost systems in large furnaces, such as float glass furnaces. The present invention also relates to implementing an optimized oxy-boost and air-fuel firing distribution and rates to achieve desired glass pull rate increases or the maintenance of the same pull rate, desired glass quality (in seeds and stones per ton, for example), maintaining refractory temperatures below safe limits, maintaining emissions (NOx, SOx, CO, $O_2$, CO, and $CO_2$) below required levels, and maintaining an optimum regenerator chamber and furnace pressure for optimum combustion airflow and air preheat level.

The present invention also relates to implementing an adaptive control system for oxy-boosting in large furnaces. Here, the controllers can learn, optimize, and/or predict the effect of various process parameters (such as pull rate, glass quality, temperatures, emissions, etc.) in the presence of oxy-boosting. The level of oxy-boost and individual air-fuel firing can be optimized using various primary and feed forward models. The controller can learn a primary process where glass pull rate or glass quality can be correlated with the level of oxy-boosting and/or individual air fuel firing rates. Additionally, several feed forward models, based on furnace crown temperatures, glass bottom temperatures, exhaust gas temperatures, emissions (NOx, $O_2$, Co, $CO_2$, and SOx), regenerator chamber pressures, glass properties, and refractory properties, etc., can be correlated with the level of oxy-boosting and individual air-fuel firing rates. This learning process by the controller can also include the development of one or more primary and feed forward models by running the furnace with and without oxyboost.

Advantages that can be achieved by the present invention include, but are not limited to, increased furnace productivity, improved glass quality (in both seed and stone count), and lower operating costs for glass manufacturing. The adaptive controller can reduce furnace settling time by more than 50% (to reach a set point), reduce settling time during furnace fuel or oxygen supply interruptions, and improve product yield and quality.

While the invention has been described in detail with reference to preferred embodiments thereof, it will be apparent to one skilled in the art that various changes can be made, and equivalents employed, without departing from the scope of the invention. Each of the aforementioned U.S. patents and other documents is incorporated by reference herein in each of their entireties.

What is claimed is:

1. A process of operating a furnace, comprising the steps of:
    firing an oxy-fuel burner into the furnace to heat a load;
    firing an air-fuel burner into the furnace to heat the load;
    measuring a furnace process parameter;
    inputting the measured process parameter into a model-free controller; and
    controlling both the firing of the oxy-burner and the firing of the air-fuel burner with the controller based on the measured process parameter.

2. A process in accordance with claim 1, wherein the furnace process parameter is selected from the group consisting of crown temperature, bottom temperature, furnace exhaust gas composition, furnace exhaust gas temperature, processed load quality, refractory condition, regenerator pressure, furnace pressure, and pull rate when glass is disposed within the furnace.

3. A system useful for heating a product, comprising:
    a furnace having a sidewall and an interior space;
    at least one oxy-fuel burner positioned to direct a flame into the furnace interior space;
    a source of an oxidant in fluid communication with the at least one oxy-fuel burner, the oxidant comprising oxygen, oxygen enriched gas, or combinations thereof;

a source of fuel in fluid communication with the at least one oxy-fuel burner;

a first valve set interposed between the oxy-fuel burner and the sources of fuel and oxidant, the first valve set operable to control the flow of oxidant and fuel to the at least one oxy-fuel burner;

at least one air-fuel burner positioned to direct a flame into the furnace interior space;

a source of air in fluid communication with the at least one air-fuel burner;

a source of fuel in fluid communication with the at least one air-fuel burner;

a second valve set interposed between the air-fuel burner and the sources of fuel and air, the second valve set operable to control the flow of air and fuel to the at least one air-fuel burner;

at least one furnace condition input device generating at least one output signal; and a model-free controller in communication with the at least one furnace condition input device to receive the at least one furnace condition input device output signal, the controller having a setpoint value for the at least one furnace value, the controller generating at least one control signal based on a comparison of the input and setpoint values, the controller being in communication with the first valve set to communicate the at least one control signal to the first valve set to set the flow rates of oxidant and fuel through the first valve set and to the oxy-fuel burner, and the controller being in communication with the second valve set to communicate the at least one control signal to the second valve set to set the flow rates of air and fuel through the second valve set and to the air-fuel burner.

4. A system in accordance with claim 3, wherein the at least one furnace condition input device comprises at least one sensor positioned to sense at least one condition of the furnace.

5. A system in accordance with claim 4, wherein the furnace has a crown and a bottom, and the at least one sensor is selected from the group consisting of a temperature sensor in the furnace crown, a temperature sensor in the furnace bottom, a pressure sensor in fluid communication with the furnace interior, an exhaust gas sensor in fluid communication with the furnace interior, and a temperature sensor for sensing the temperature of the furnace exhaust gas.

6. A system in accordance with claim 2, wherein the at least one furnace condition input device comprises an input device adapted for communicating data to the controller indicative of glass quality when glass is disposed within the furnace.

7. A system in accordance with claim 2, wherein the at least one furnace condition input device comprises an input device adapted for communicating data to the controller indicative of batch line location in the furnace when glass is disposed within the furnace.

8. A system in accordance with claim 2, wherein the at least one furnace condition input device comprises an input device adapted for communicating data to the controller indicative of furnace pull rate.

9. A system in accordance with claim 3, wherein the at least one control signal comprises a first control signal set and a second control signal set, the controller being in communication with the first valve set to communicate the first control signal set to the first valve set to set the flow rates of oxidant and fuel through the first valve set and to the oxy-fuel burner, the controller being in communication with the second valve set to communicate the second control signal set to the second valve set to set the flow rates of oxidant and fuel through the second valve set and to the port burner.

* * * * *

UNITED STATES PATENT AND TRADEMARK OFFICE
CERTIFICATE OF CORRECTION

PATENT NO.    : 6,454,562 B1
DATED         : September 24, 2002
INVENTOR(S)   : Mahendra L. Joshi and Ovidiu Marin It is certified that error appears in the above-identified patent and that said Letters Patent is hereby corrected as shown below:

<u>Column 12,</u>
Lines 9, 14 and 20, please delete the number "2" and insert the number -- 3 --.

Signed and Sealed this

Twenty-fifth Day of November, 2003

JAMES E. ROGAN
*Director of the United States Patent and Trademark Office*